United States Patent [19]

Robb

[11] 4,179,133
[45] Dec. 18, 1979

[54] APPARATUS FOR CONVERTING A SKATEBOARD INTO A SCOOTER

[76] Inventor: Robert B. Robb, P.O. Box 385, Oroville, Calif. 95965

[21] Appl. No.: 888,014

[22] Filed: Mar. 20, 1978

[51] Int. Cl.² ............................................. B62K 9/00
[52] U.S. Cl. .......................................... 280/87.04 R
[58] Field of Search ............ 280/87.01, 87.02 R, 280/87.04 R, 87.04 A, 87.05, 606, 47.37 R; 248/226.1, 226.4, 316 A; 403/233, 234, 236

[56] References Cited

U.S. PATENT DOCUMENTS

| | | | |
|---|---|---|---|
| 1,253,768 | 1/1918 | Aman | 280/87.04 R |
| 3,751,062 | 8/1973 | White | 280/87.04 A |
| 4,061,351 | 12/1977 | Bangle | 280/87.04 A |

Primary Examiner—Joseph F. Peters, Jr.
Assistant Examiner—R. Schrecengost
Attorney, Agent, or Firm—Mark C. Jacobs

[57] ABSTRACT

Apparatus for converting a conventional skateboard into a scooter. A skateboard-receiving support is provided having an upright member at one end and steering handles at the upper end of the upright member. Any conventional skateboard can be quickly and easily secured to the support and used as a scooter without damage or change to the skateboard. The skateboard can be quickly and easily removed for use in its conventional manner.

15 Claims, 10 Drawing Figures

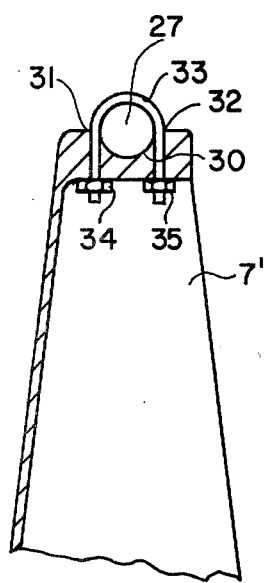
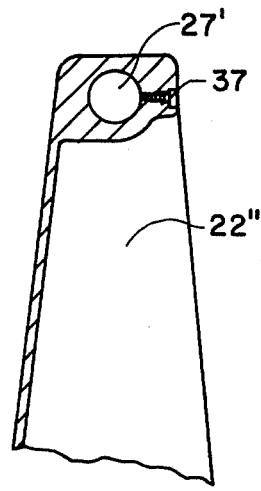
FIG 3          FIG 4
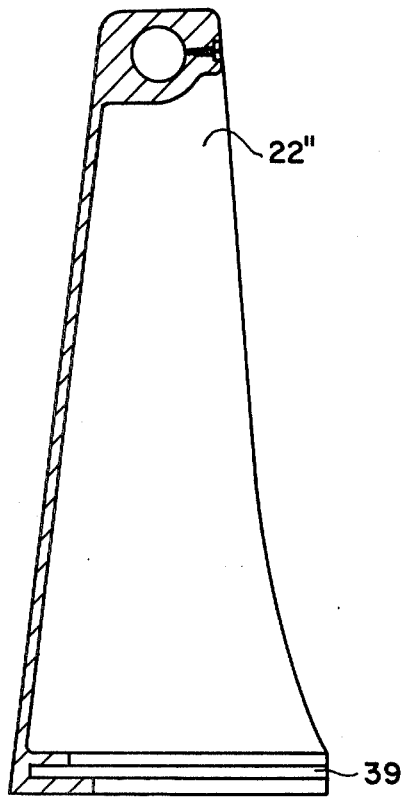
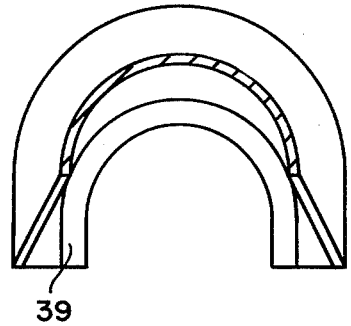
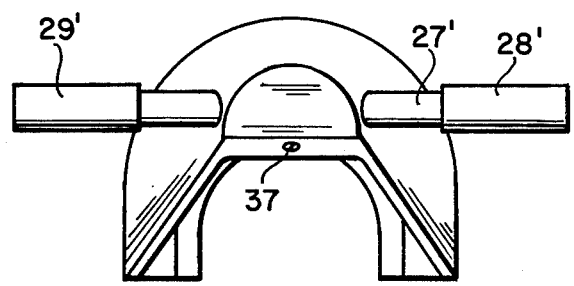
FIG 5          FIG 7

4,179,133

APPARATUS FOR CONVERTING A SKATEBOARD INTO A SCOOTER

BACKGROUND OF THE INVENTION

1. Field of the Invention

The invention relates to scooters; and, more particularly, to apparatus for converting a conventional skateboard to a scooter.

2. Description of the Prior Art

The tremendous growth of the use of skateboards in recent years has resulted in the availability of many such skateboards to children of all ages. However, the skillful use of such skateboards may be beyond that of many children. There is thus a need for using such skateboards in a manner whereby even the most unskilled child can enjoy the use thereof. Also, there is a need for being able to use such skateboards by anyone in an entertaining manner.

SUMMARY OF THE INVENTION

It is an object of the invention to provide apparatus for converting a conventional skateboard to a scooter.

It is a further object of this invention wherein the foregoing object is carried out in a manner whereby the skateboard can be removed easily from the apparatus and used in its conventional manner.

It is still another object of this invention to carry out the foregoing objects without permanent damage or change to the skateboard.

These and other objects are preferably accomplished by providing a skateboard-receiving support having an upright member at one end with steering handles on the upright member. Any conventional skateboard can be used and removed from the apparatus for regular use without permanent damage to the skateboard.

BRIEF DESCRIPTION OF THE DRAWINGS

FIGS. 3 and 4 are side cross-sectional views of a portion of modified upright members in accordance with the teachings of my invention;

FIG. 5 is a vertical side cross-sectional view of the embodiment of FIG. 4.

FIG. 6 is a cross-sectional view taken along lines VII—VII of FIG. 2, but rotated 180°;

FIG. 7 is a top plan view of the embodiment of FIGS. 4 and 5 showing handle means installed thereon;

DESCRIPTION OF THE PREFERRED EMBODIMENTS

Figure 1:
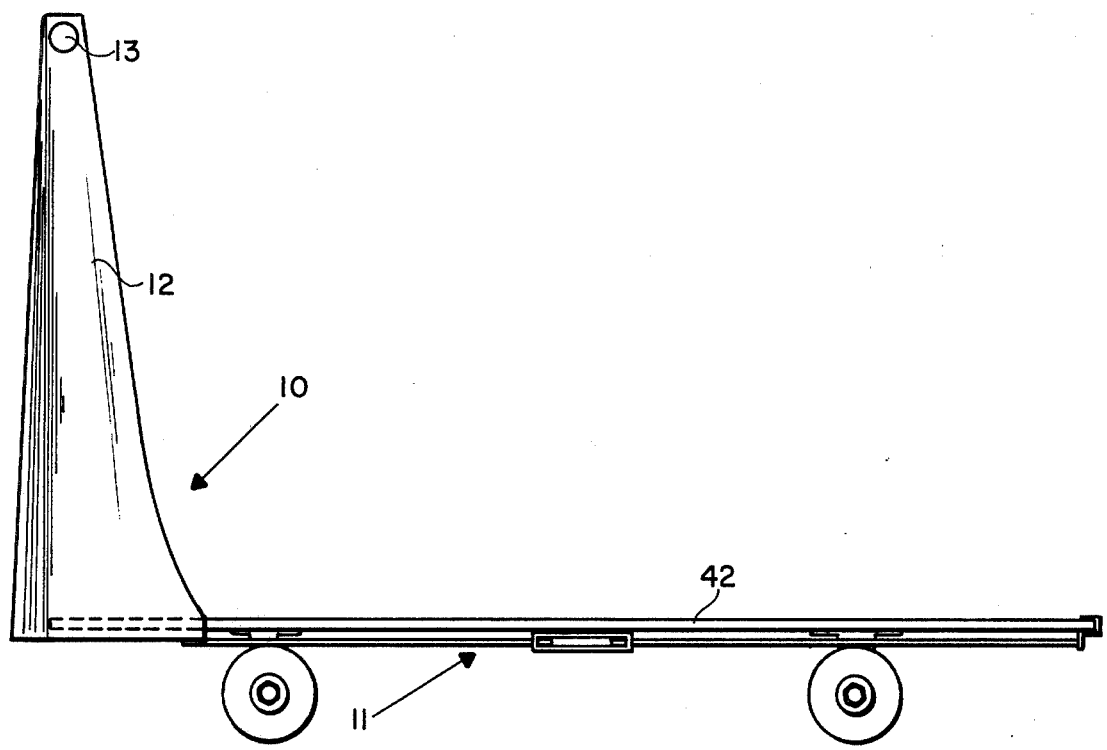
FIG. 1 is a side perspective view of an apparatus for converting a conventional skateboard into a scooter including the skateboard in accordance with the instant invention.

Referring now to FIG. 1 of the drawing, apparatus 10 is shown for converting a conventional skateboard to a scooter. Apparatus 10 includes main optional skateboard-receiving support means 11, upright means 12 and handle means 13. In the exemplary embodiment of the invention, the skateboard-receiving support means 11 includes a pair of spaced elongated rods 14, 15, each rod 14, 15 having a conventional adjustable turnbuckle 16, 17, respectively, intermediate its free ends. Of course, any suitable means may be used in place of turnbuckles 16, 17 for quickly and easily adjusting the overall length of rods 14, 15. A flat support plate 18 is riveted or otherwise secured to each rod 14, 15 at one end of rods 14, 15. A pair of spaced upwardly curved U-clamps 19, 20 are secured to plate 18 rearwardly of rods 14, 15 as shown in FIG. 1. If desired, clamps 19, 20 may be swivelly or pivotally attached to plate 18, as by threaded couplings 19', 20', respectively, to provide for lateral adjustment. Also, clamps 19, 20 may be covered with a resilient cushioning material, such as rubber, to provide for a cushioning means on the skateboard to be used in apparatus 10.

The spacing between rods 14, 15 and clamps 19, 20, is such that a conventional skateboard may be clamped therein. That is, the width of the skateboard is greater than the distance between rods 14, 15, as will be discussed.

Although skateboards come in various sizes, I have found that a distance between rods 14, 15 of about 4" and an overall length of rods 14, 15 of about 16" is sufficient for most skateboards.

The forward ends of rods 14, 15 are secured in suitable apertures 21, 22 in upright means 12. The overall length of cross-rod 21 may be about 6" in accordance with the preferred dimensions previously stated. The rods 14, 15 may extend within apertures 23, 22 and through upright member 12, as will be discussed, and, as shown in FIG. 2, are secured by bolts 24, 25, respectively.

Before discussing the skateboard-receiving means 11 further, upright means 12 will be discussed. Upright means 12 (FIGS. 1 and 2) includes a main upright member 7 generally trapezoidally-shaped as in FIG. 2 terminating at its upper end in a through aperture 26 for receiving handle means 13, as will be discussed. The overall height may be about 20" in accordance with the dimensions previously stated. This member 7 may be a one-piece molded unit, if desired, as of plastic or the like.

Figure 2:
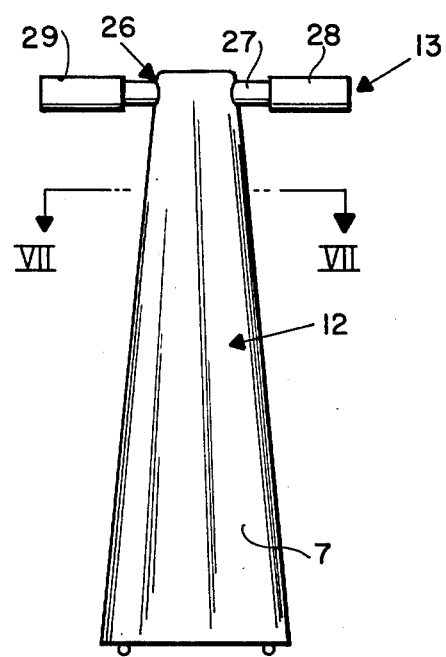
FIG. 2 is a vertical front view of the apparatus of FIG. 1.

Handle means 13, in the FIG. 2 embodiment, may include a transverse rod 27 with handles or grips 28, 29 at each end. These grips 28, 29 may be resilient and rod 27 may be inserted into aperture 26 or the entire handle means 13 may be molded as one-piece or otherwise integral with upright member 7. Grips 28,29 may be removeable from rod 27. Alternatively, as shown in FIG. 3, the upper end of a molded upright member 7', otherwise similar to member 7, may have an arcuate depression 30 with a pair of apertures 31, 32 on each side of depression 30. A U-bolt 33 may be installed in apertures 31, 32 with suitable nuts 34, 35 for adjusting the width of the opening formed by bolt 33 and depression 30. In this matter, rod 27, FIG. 2, may be inserted in this opening and nuts 34, 35 tightened to secure the rod 27 firmly in place.

As another modification, as shown in FIGS. 4 through 6, an aperture 36 may be molded in a molded upright member 22", otherwise similar to member 7, having a set screw 37 adapted to secure a removable handle rod, such as rod 27', FIG. 7, having handles 28', 29', thereon. Set screw 37 holds rod 27', in position. Also, as can be seen in FIGS. 3 through 5, the forward facing vertical surface 38 (FIG. 1) may be rearwardly inclined from the vertical, as for example, tapering upwardly to a distance of about 3" from the vertical at its upper end, to relocate the center of gravity of apparatus 10 when used as a skateboard.

The lower end of member 7 is arcuate as shown in FIG. 6 and terminates in an arcuate slot 39 for receiving therein the forward end of a skateboard, as will be discussed. Slot 39 may be of a thickness related to that of the skateboard to be used thus providing a friction fit, tightening of turnbuckles 16, 17 firmly securing the skateboard therein as will be discussed.

Figure 8:
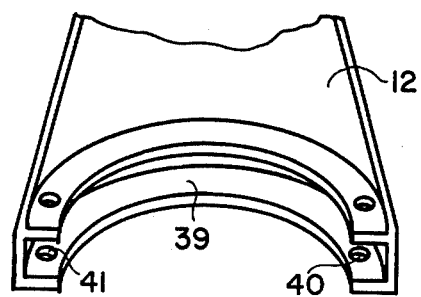
FIG. 8 is a perspective view of the lower portion of the embodiment of FIG. 2, viewed from the rear.
Figure 9:
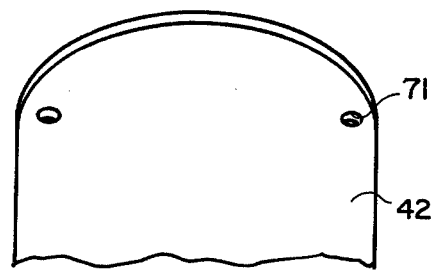
FIG. 9 is a top plan view of a skateboard for insertion into the slot of the upright member of FIG. 8, only a portion of the board being depicted.

Slot 39 is shown in FIG. 8. If desired, a pair of vertically aligned apertures 40, 41 may be provided extending on both sides of slot 39. As shown in FIG. 9, a skateboard 42 may be inserted in slot 39 with like apertures 71, provided in the skateboard, aligned with apertures 40, 41, and suitable nuts and bolts not seen, inserted therein to provide a more secure fit. This embodiment alleviates the need for rods 14,15 and turnbuckles 16,17.

Figure 10:
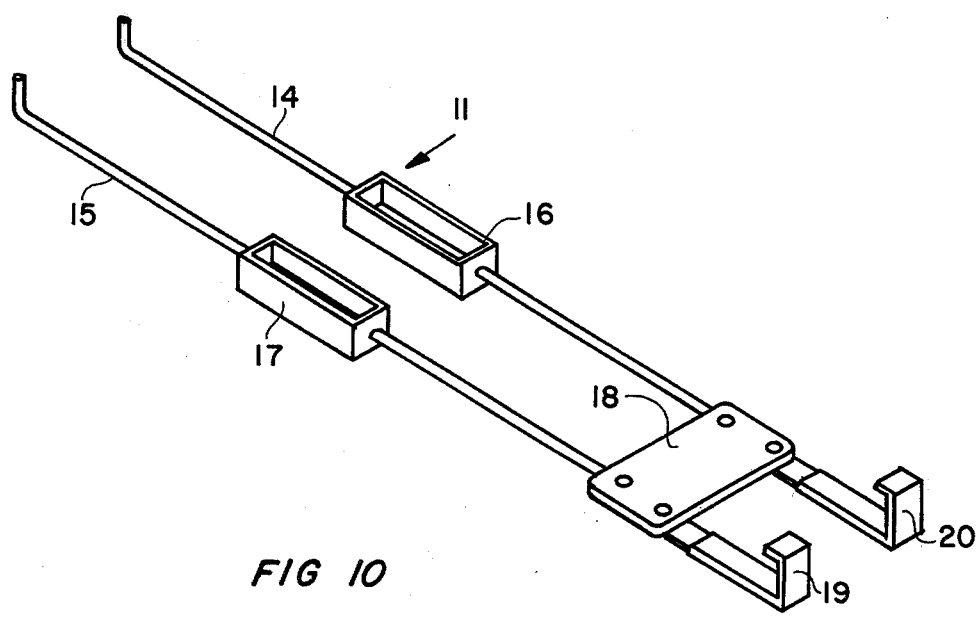
FIG. 10 is a perspective view of the skateboard receiving support means forming part of this invention.

As shown in FIG. 10, the front of a conventional skateboard 45 is inserted into slot 39 of upright member 22 with clamps 19 and 20 engaging the rear of skateboard 45. The clamps 19 and 20 may be slightly laterally adjustable to provide a good grip. Turnbuckles 16, 17 are then tightened which draws clamps 19, 20 toward slot 39 and thus securely clamps skateboard 45 therein. Skateboard 45 may frictionally fit into slot 39 with lateral movement prevented by tightening of turnbuckles 16, 17. Of course, holes or apertures may be provided in the skateboard and adjacent slot 39 as discussed with respect to FIG. 9 to prevent further lateral movement.

Any suitable materials may be used and the various components may be manufactured of wood, plastic, metal, etc., and of various and/or molded components as heretofore discussed. It can also be made in various dimensions and sizes and can accomodate skateboards of varying dimensions.

The user can grip the handles 28, 29 while keeping one foot on the platform of skateboard 45 and pushing with the other. Thus, the skateboard 45 can be quickly and easily converted to a scooter using the apparatus 10 of my invention. After such use, the skateboard 45 may be released from apparatus 10 by loosening turnbuckles 16, 17. The foregoing can be accomplished without permanent damage to the skateboard.

Reference is made to FIG. 1, the side elevational view, which shows the skateboard 45 inserted into slot 39, and held in place by a tightening of turnbuckles 19 and 20.

While not shown in the drawings, it is seen that rods 14 and 15 can be secured to upright means 12, by being inserted through two parallel or one, pendent member axially bored to receive said rods 14,15, whereby the rods are retained by the use of suitable nuts screwed into the ends of threaded rods.

It is seen that the first embodiment, which employs the rods 14,15 and the turnbuckles 16 and 17 does not require any alteration of skateboard 45 in order to be employed with apparatus 10. This is important, since some skateboards are made of moulded fibreglass or other material that does not readily lend itself to drilling and the insertion of bushings as may be necessary for securing same to apparatus 10 with bolts through apertures 40 and 41 as per FIG. 8.

On the other hand, wood skateboards 45 which are easily drilled may be permanently installed, though removeably so, by the use of the aforesaid mounting bolts and nuts 43,44.

Another embodiment which though not specifically disclosed in any single drawing, would employ the rods 14,15 and turnbuckles 16 and 17, in conjunction with mounting bolts and nuts 43,44 for use in apertures 40,41, for an even more secure attachment of the skateboard 45 to the apparatus 10. FIG. 1 shows this without board 45.

It can be concluded therefore that the mode of attachment of the board 45 to the apparatus 10 is within the decision capability of the user and will depend his or desire for degree of permanence of attachment, or stated in the corollary, the ease of removal, and whether or not he desires to drill holes in the skateboard. It is seen, that at least in wood boards and more than likely in solid dense plastic ones, that the drilling of the holes in the board for alignment with apertures 40,41, will inflict no permanent damage to the skateboard.

In order to assure a tight fit of board 45 in slot 39, it has been found beneficial to wrap a strip of foam rubber or flat gasket around the front of the board 45 where it engages slot 39.

Since certain changes may be made in the above products without departing from the scope of the invention herein involved, it is intended that all matter contained in the above description shall be interpreted as illustrative and not in a limiting sense.

I claim:

1. Apparatus for converting a conventional skateboard having a platform and wheels to a scooter comprising:

a skateboard-receiving support means having a skateboard retaining member at one end, an upright member, mounted at the other end of said support means, said support means being longitudinally adjustable between said upright member and said retaining member;

said upright member having a skateboard retaining portion adjacent the support means, both said retaining member and said retaining portion being aligned in a horizontal plane for securing a skateboard therebetween; and handle means at the upper end of said upright member extending transverse to the longitudinal axis of said upright member.

2. In the apparatus of claim 1 wherein said skateboard-receiving support means includes a pair of spaced longitudinally extending support rods, and adjusting means on each of said rods for adjusting their overall length.

3. In the apparatus of claim 2 wherein said adjusting means includes turnbuckles on each of said rods.

4. In the apparatus of claim 2 wherein said rods are interconnected adjacent said retaining member, said retaining member including a pair of U-shaped members, each of said members aligned with each of said rods and curving in a direction away from said rods and upwardly and inwardly of said rods so as to engage the rear end of the platform of a skateboard.

5. In the apparatus of claim 4 wherein said U-shaped members are laterally adjustable.

6. In the apparatus of claim 4 wherein said retaining portion includes an arcuate slot at the lower end of said upright member, said arcuate slot opening in a direction toward said U-shaped members for receiving the forward end of the platform of a skateboard therein.

7. In the apparatus of claim 6 wherein the thickness of the opening of said arcuate slot is slightly less than the thickness of a conventional skateboard so as to provide a friction fit for the platform of a skateboard inserted therein.

8. In the apparatus of claim 6 including vertically aligned apertures in said slot on both sides thereof.

9. In the apparatus of claim 1 wherein said handle means includes an elongated rod fixedly secured to said upright member on both sides thereof, the terminal ends of said rod having handle grips thereon.

10. In the apparatus of claim 9 wherein said rod is integral with said upright member.

11. In the apparatus of claim 9 wherein said rod extends through an opening, in said upright member, and locking means on said upright member for engaging said rod for locking the same.

12. Apparatus for converting a conventional skateboard having a platform and wheels into a skooter comprising:
skateboard-receiving support means having an upright member at one end and a skateboard engaging member at its other end, said skateboard engaging member engaging the rear end of the platform of said skateboard, said upright member having a skateboard-receiving portion therein receiving the forward end of said skateboard therein, said support means being longitudinally adjustable to thereby firmly secure said skateboard between said engaging member and said receiving portion; and
handle means at the upper end of said upright member extending tranverse to the longitudinal axis of said upright member for steering said apparatus.

13. In the apparatus of claim 12 wherein said receiving portion is an arcuate slot in said upright member and said engaging member includes a pair of spaced curved brackets curving over and about the rear end of said platform.

14. In the apparatus of claim 13 including a pair of spaced vertical apertures in said platform and a pair of spaced vertical apertures in said slot, one of said apertures in said slot being vertically aligned with one of the apertures in said platform, and the other of said apertures in said slot being vertically aligned with the other of said apertures in said platform, and releasable retaining means in each of said aligned apertures for retaining said platform in said slot.

15. In the apparatus of claim 14 wherein said upright member includes a front wall extending generally vertically upwardly and inwardly toward said support means to said handle means.

* * * * *